UNITED STATES PATENT OFFICE.

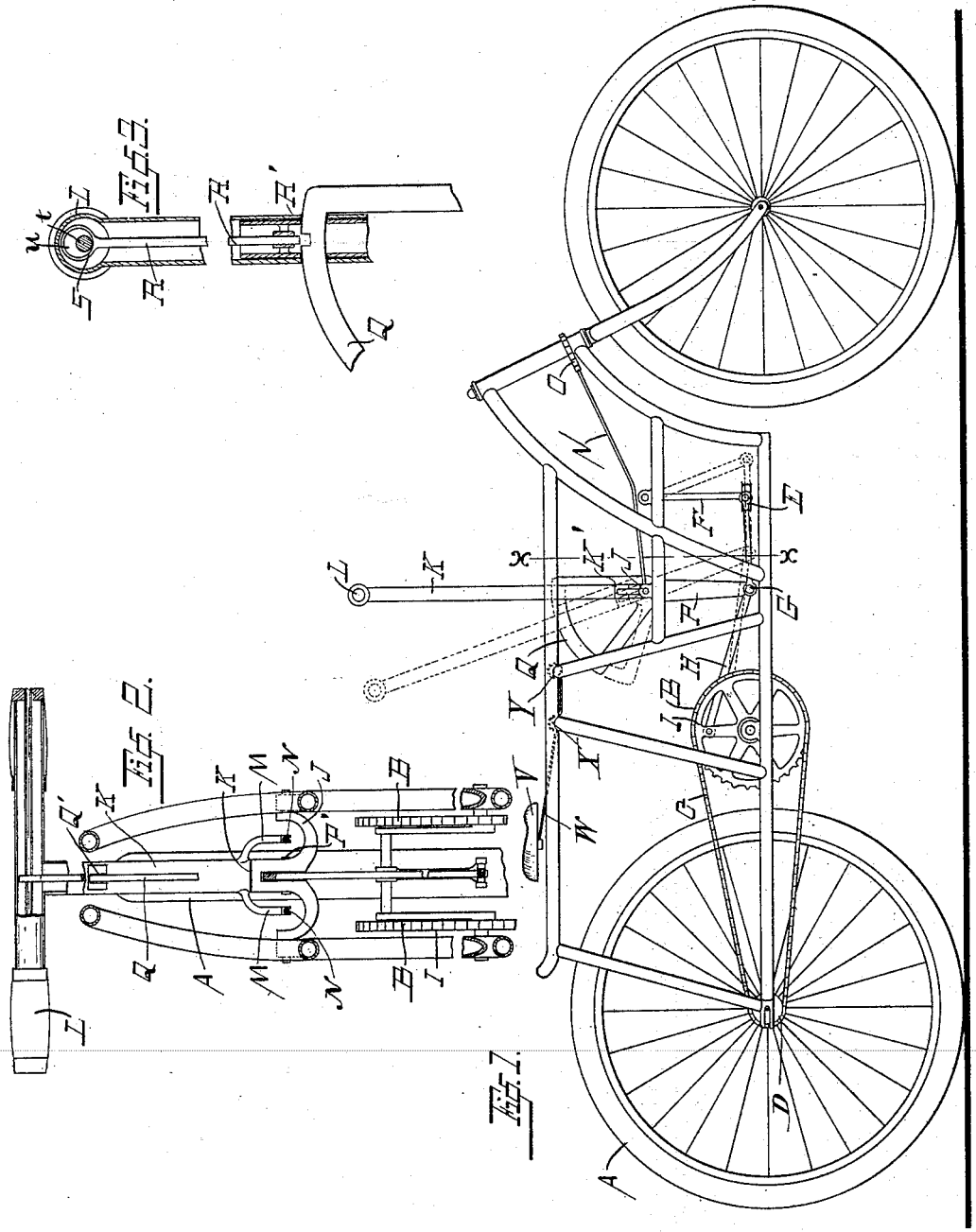

CHARLES E. CAIN, OF MILWAUKEE, WISCONSIN, ASSIGNOR OF ONE-HALF TO ALFRED R. CAIN, OF SAME PLACE.

BICYCLE.

SPECIFICATION forming part of Letters Patent No. 604,226, dated May 17, 1898.

Application filed May 21, 1897. Serial No. 637,513. (No model.)

*To all whom it may concern:*

Be it known that I, CHARLES E. CAIN, a citizen of the United States, residing at Milwaukee, in the county of Milwaukee and State of Wisconsin, have invented new and useful Improvements in Bicycles, of which the following is a specification.

My invention relates to improvements in bicycles.

The object of my invention is to provide means for operating the bicycle by both hand and foot power or by foot-power independently of the hand-power, as described.

In the following description reference is had to the accompanying drawings, in which—

Figure 1 is a side view of my invention. Fig. 2 is a section view, drawn on the line $x\,x$ of Fig. 1, with the handle-bar and a portion of the hand-lever drawn in vertical section to show the means for actuating the locking-rod. Fig. 3 is a central vertical section view of the handle-lever drawn at right angles to the handle-bars.

Like parts are identified by the same reference-letters throughout the several views.

The rear wheel A of my bicycle is actuated from the driving-sprockets B by means of chains C and pinions D, the latter being located upon the shaft of the wheel A, one on each side thereof. The sprocket-wheels are driven by foot-power from a transverse pedal-rod E, which is suspended from the frame by means of the swinging arms F and is adapted to be oscillated or swung to the front and rear as actuated by the feet of the rider. The motion of the pedal-rod E is communicated to the driving-sprocket B through a connecting-link G, crank-rod H, and crank-shaft I.

Journaled to the frame in the rear of the swinging arms F is an oscillatory bracket J, to which I have swiveled a handle-lever K, having a handle-bar L at its upper end and offset arms M M near its lower end, the latter projecting downwardly to the center of oscillation of the bracket J and being jointed at that point to the steering-rods N, which are connected to the bicycle steering-head by a flexible connection O.

The under side of the bracket J is provided with a centrally-disposed recess, in which I have fulcrumed a connecting-lever P upon the cross-pin P', located on the axis or center of oscillation of the bracket. The lower end of the lever P is jointed to the crank-rod H at G', and its upper end is provided with a sector-shaped frame Q, which passes through a slot Q' in the handle-lever, the slot being sufficiently large to permit the lever K to rotate partially for the purpose of steering the vehicle. The lever is secured to the sector by means of a locking-bar R, which removably engages in a notch R in the sector, as hereinafter explained.

From the construction as above described it will be observed that the reciprocal movement of the handle-bar is communicated to the driving-sprockets through the lever K, sector Q, connecting-lever P, crank-rod H, and shaft I. At the same time the vehicle may be guided by rotating the lever K upon the swivel-joint K', its movement being communicated to the bicycle steering-head through the arms M, rods N, and flexible connection O.

In order to provide for connecting or disconnecting the handle-bar and lever K from the remainder of the driving mechanism, I have extended the bar upwardly in the tubular lever K and provide it with an eye S at its upper end. The handles T are rotatably supported on the handle-bar and are connected by a rod $t$, running through the eye S and provided with an eccentric U, fitting within the eye, whereby the rotation of the handles is adapted to lift or depress the bar R, and thus engage it in or disengage it from the notch R' of the sector. When the bar is raised, the handle-bar and lever K are free to move to the front and rear independently of the sector and the other parts of the driving mechanism. The saddle V of my bicycle is located upon a bar W of spring metal, which passes over a cross-bar $x$ of the frame and hooks underneath a cross-bar Y.

Having thus described my invention, what I claim as new, and desire to secure by Letters Patent, is—

1. In a bicycle, the combination with the rear wheel, of a pair of drive-sprockets, suitable connections for communicating motion to said wheel, a reciprocatory pedal-rod suspended in the bicycle-frame, means for communicating motion therefrom to the drive-sprockets, an oscillatory bracket supported in said frame, with a hand-lever swiveled thereto, a connecting-lever adapted to communicate the motion of the hand-lever to the foot-actuated connections and means for disengaging said connecting-lever from the hand-lever whereby the latter may be permitted to move independently, substantially as described.

2. In a bicycle, the combination of a foot driving mechanism, an oscillatory bracket journaled in the bicycle-frame, a tubular hand-lever swiveled thereto, a connecting-lever fulcrumed to said bracket on the axis of its journals with its lower end connected with the foot driving mechanism and provided with a sector running through a slot in said hand-lever, a locking-bar located in said hand-lever and adapted to engage in a recess in said sector and rotatable handles connected with said locking-bar and arranged to actuate the latter with reference to its engagement in the notch in said sector, substantially as described.

3. In a bicycle, the combination of a foot driving mechanism, an oscillatory bracket journaled in the bicycle-frame, a hand-lever swiveled thereto and provided with offset downwardly-projecting arms, rods connected to said arms by a universal joint on the axis of the bracket-journals and united to the steering-head by a flexible connection, a lever fulcrumed to said bracket on the axis of its journals, and connected with the foot driving mechanism and a detachable connection between said hand-lever, and said connecting-lever, substantially as described.

4. In a bicycle, the combination of a foot driving mechanism, an oscillatory bracket journaled in the bicycle-frame, a tubular hand-lever swiveled thereto and connected with the bicycle steering-head, a connecting-lever fulcrumed to said bracket on the axis of its journals and provided with a sector running through a slot in said hand-lever, a locking-bar located in the interior of the hand-lever and adapted to engage in a notch in said sector, handles adapted to rotate upon a handle-bar and connected by a rod running through an eye in the upper end of the locking-rod, with an eccentric fitted to said eye whereby the rotation of said handles is adapted to engage and disengage the locking-rod from the notch in said sector, substantially as described.

In testimony whereof I affix my signature in the presence of two witnesses.

CHARLES E. CAIN.

Witnesses:
LEVERETT C. WHEELER,
LYMAN G. WHEELER.